United States Patent [19]
Moon

[11] 3,794,132
[45] Feb. 26, 1974

[54] SELF-PROPELLED WHEELCHAIR
[75] Inventor: Robert W. Moon, Shorewood, Wis.
[73] Assignee: Lakeside Manufacturing Inc., Milwaukee, Wis.
[22] Filed: Aug. 16, 1972
[21] Appl. No.: 281,081

[52] U.S. Cl. .............. 180/13, 180/26 R, 180/65 R, 280/111
[51] Int. Cl. ............................................ B62d 61/00
[58] Field of Search ... 180/13, 15, 23, 25, 26 R, 65, 180/DIG. 3; 188/2 F; 280/111

[56] References Cited
UNITED STATES PATENTS

| | | | |
|---|---|---|---|
| 2,838,124 | 6/1958 | Cramer | 280/111 X |
| 2,892,506 | 6/1959 | Slater | 180/26 R |
| 3,023,825 | 3/1962 | Rabjohn | 180/15 |
| 3,179,199 | 4/1965 | Moran | 180/65 R |
| 3,387,681 | 6/1968 | Rabjohn | 180/13 |
| 3,605,929 | 9/1971 | Rolland | 180/26 R |
| 3,664,450 | 5/1972 | Udden et al. | 180/65 R |

Primary Examiner—Evon C. Blunk
Assistant Examiner—Johnny D. Cherry
Attorney, Agent, or Firm—Arthur H. Seidel

[57] ABSTRACT

A self-powered wheelchair with four ground engaging wheels, the two rear wheels being mounted on a rear axle that is pivoted about a fore and aft axis at its midpoint for limited tilting in a vertical, transverse plane, one of the front wheels being an idler at one side of the chair, and the other front wheel being part of a power unit at the opposite side of the chair. The power unit is steerable about a vertical axis by turning a steering shaft that rises upwardly and turns rearwardly to present a tiller arm, such tiller arm having a control box at its upper end that presents a vertical palm engageable handle for turning the tiller, and a vertically depressible thumb engageable speed selector rod for governing the speed of the chair. There is also a brake mechanism associated with the rear wheels of which a part tilts with the rear axle and mounts brake shoes to apply desired braking force regardless of the degree of axle tilt.

10 Claims, 14 Drawing Figures

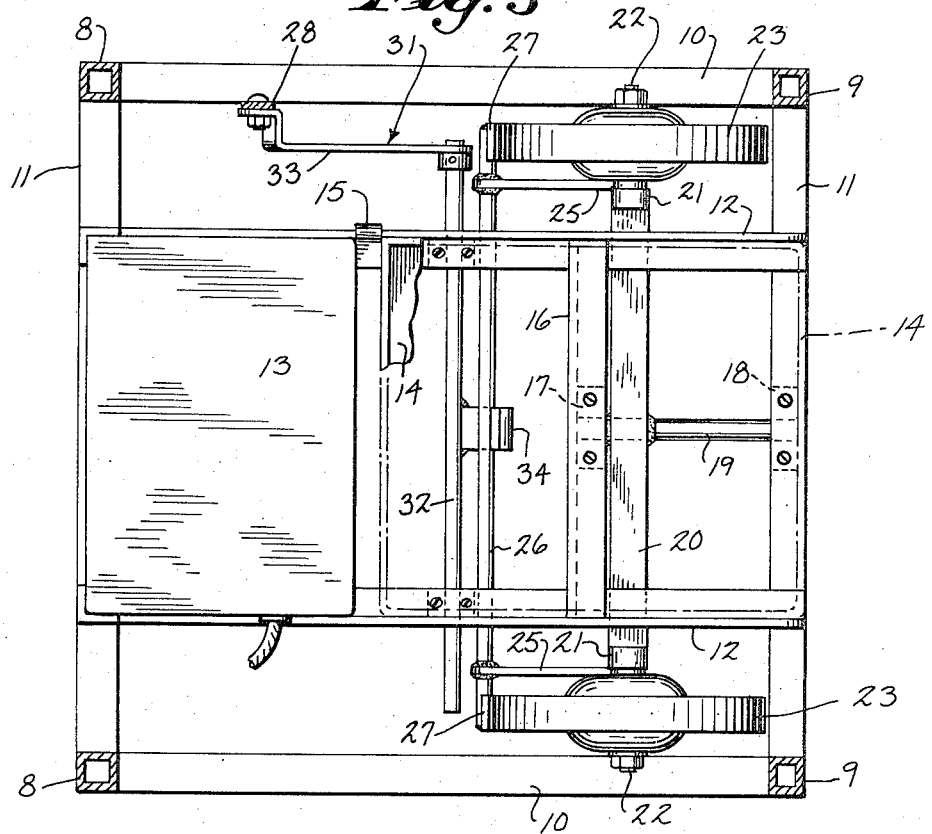
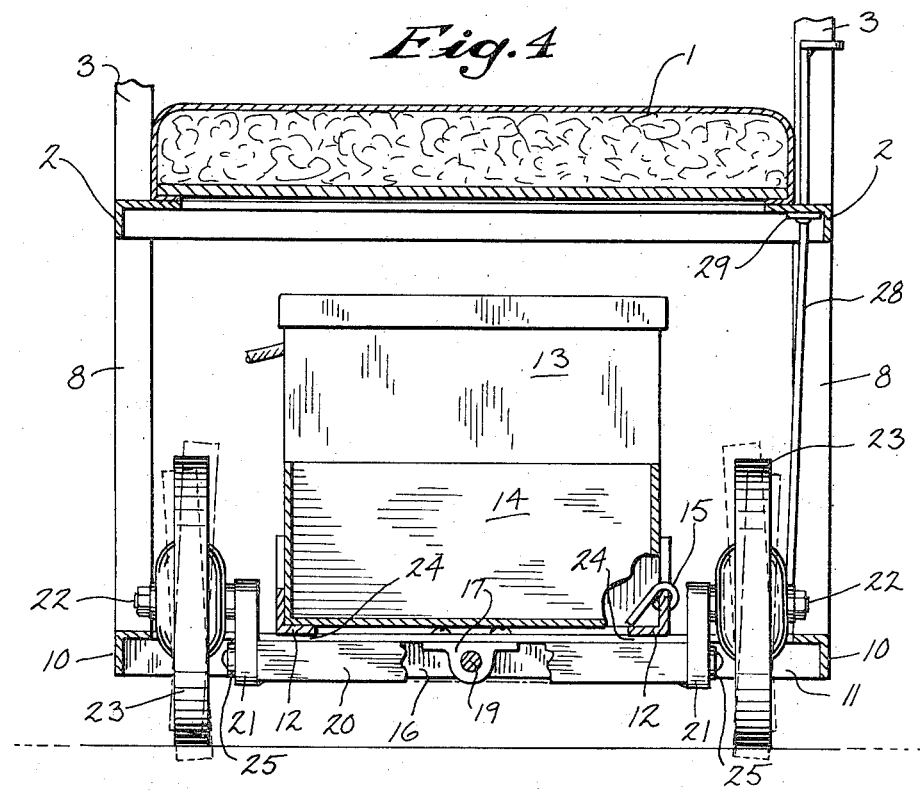

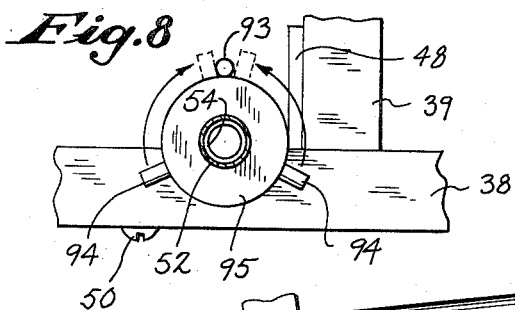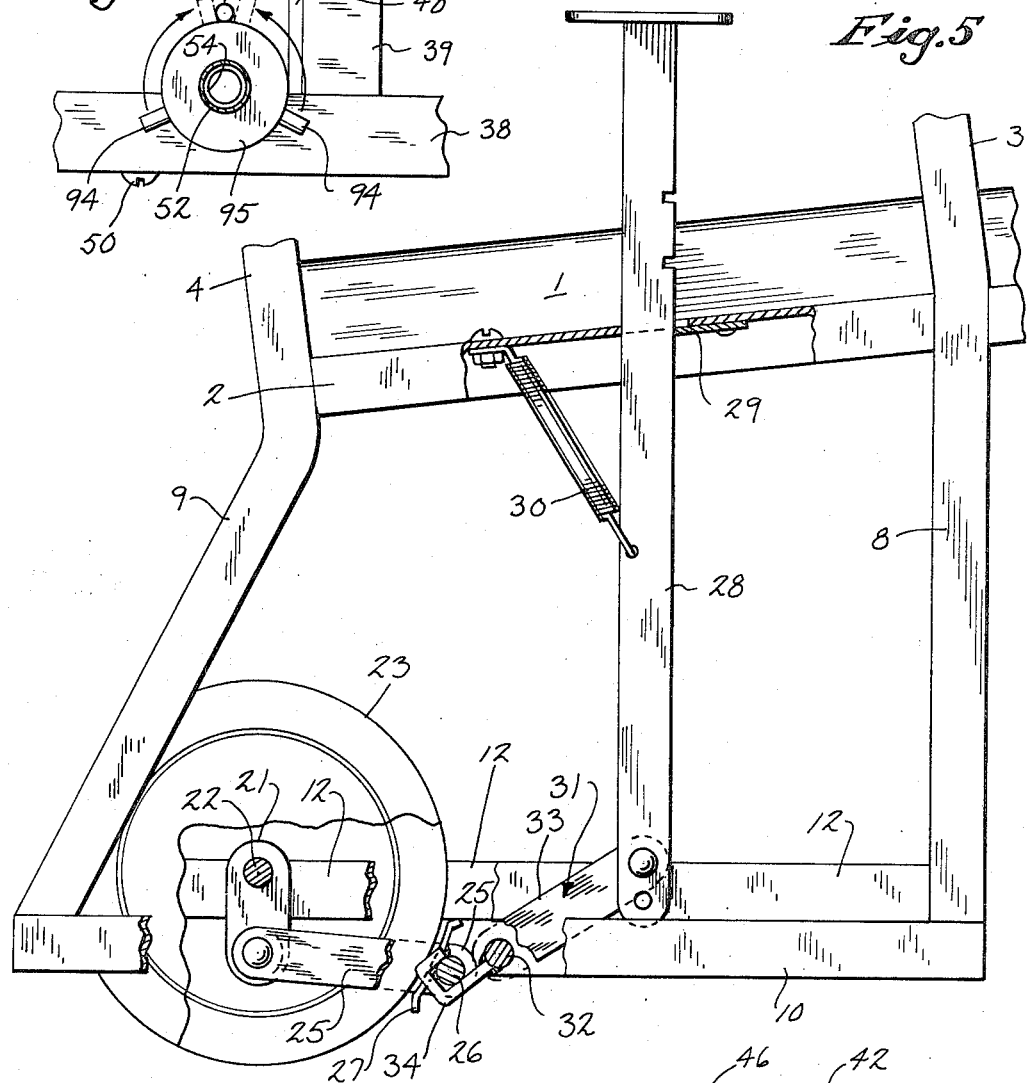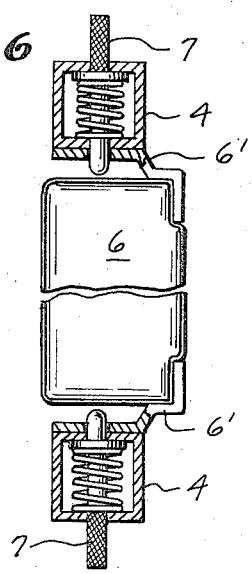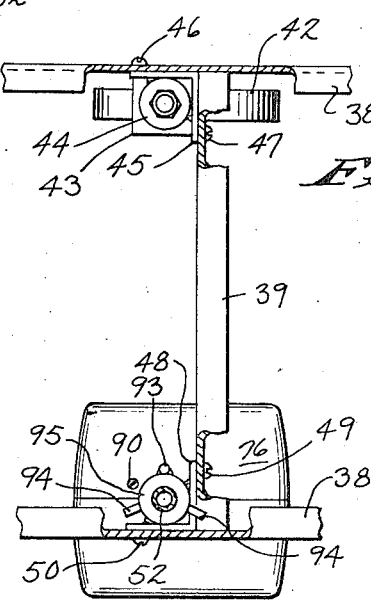

SELF-PROPELLED WHEELCHAIR

BACKGROUND OF THE INVENTION a. Field of the Invention

The present invention pertains to motorized wheelchairs for elderly people, the incapacitated and infirm, patients, and the like.

b. Description of the Prior Art

Mechanized wheelchairs with electric motor drives have been known, and have taken a variety of differing design forms, but they have not found widespread usage among those who could benefit from their use. Some of the earlier designs retained the basic design of hand driven wheelchairs that are characterized by a large diameter wheel at each side which extends upward above chair seat height, and which may be grasped by the user for propelling and steering the chain. One such form is shown in U.S. Pat. No. 2,448,992 wherein a detachable power unit with a single ground engaging wheel is attached to the rear of a wheelchair. The power unit contains a motor and battery, and a control arm extends forward from the power unit alongside the chair. This design creates a five wheel vehicle, makes for a very large cumbersome device, and adds expense directly to the full expense of an ordinary chair.

A somewhat similar approach, of preserving large wheels and the basic design of a manual chair, is disclosed in U.S. Pat. No. 2,635,703. There, two large wheels are retained at the rear, and a single wheel of a motor driven unit is located at the front. A three wheel device results which is less stable than conventional four wheel chairs, and if the user's weight shifts forward a rocking can occur about the single, front wheel. Tilting, to the point of upsetting the chair, can occur in extreme conditions of weight shift. Although a three wheel vehicle has the inherent disadvantage of decreased stability this type of design has been carried over into a number of chairs, as evidenced by U.S. Pat. Nos. 2,482,203 and 3,213,957.

A three wheel device ensures that each wheel engages the ground at all times, and where one of the wheels provides power for locomotion and steering this is quite essential. In a four wheel vehicle, if one wheel drives and steers, and loses engagement with the ground, then control is lost. This cannot be tolerated, for a wheelchair carrying an invalid, aged person, or patient must feel secure to the user at all times.

At least two designs have been suggested for preserving the desirable stability characteristic of a four wheel chair, while still having a single driving wheel engaging the ground. In U.S. Pat. No. 3,023,825 the driving wheel is added as a fifth wheel directly in front of a forward wheel at the front of the chair. A spring biases the driving wheel downward, so that it engages the ground even though the associated front wheel might leave the terrain because of unevenness or some similar reason. In related U.S. Pat. No. 3,387,681 the associated front wheel is eliminated, and a spring suspension for the driving-steering wheel keeps the wheel in contact with the ground at all times. This later construction has had commercial application for several years.

SUMMARY OF THE INVENTION

The present invention provides a wheelchair having four ground engaging wheels in which two of the wheels are tied together on a common axle that tilts about a transverse pivot axis, to result in an effective three point type engagement that maintains a power-steering wheel in ground engaging contact, but which exhibits the stability of four wheel vehicles. The invention may further include a brake mechanism for the pivotable axis that has a brake rod mounting brake shoes alongside the axle supported wheels that pivots with the axle, and which also has manually operable portions on the chair proper which have a lost motion connection with the brake rod. In its fullest form, the invention also has improved steering and speed control.

To combine both the stability of four wheel construction and the ground hugging of three wheel construction into a wheelchair that is designed specifically for motor driven operation, in which there is a single power-driven wheel that should be kept in ground engagement at all times, regardless of any unevenness of terrain, the present invention makes use of an axle pivoted near its mid-point about a four and aft axis. This type of wheel suspension, in itself, is not new as evidenced by U.S. Pat. Nos. 2,791,044 and 2,510,424, wherein cart beds have one set of wheels suspended in such manner, and U.S. Pat. No. 3,605,929 wherein a three wheel golf cart has two rear wheels suspended on a pivoted axle frame. U.S. Pat. No. 3,159,229 makes a related showing of a vehicle chassis divided into component parts that are connected by a universal joint.

The present invention, however, makes a pivoted axle construction feasible for a wheelchair by introducing several novel concepts. The pivotal motion is limited by stop abutments extending over the axle which are an integral part of the framework of an undercarriage for the chair proper. In preferred form, the abutments can serve the double funtion of a rack for an energy cell and a storage box, and by limiting the degree of axle pivot attainable the user of the chair will feel secure and have confidence in the use of his chair regardless of infirmities he may be subjected to such as age, post-operative debilities, or other physical impairments.

Positive braking is provided for the rear wheels by a unique mounting of the braking shoes that are brought to bear against the wheels. The shoes are mounted to move with the wheels as any axle pivot occurs, so that the wheels and shoes remain aligned at all times. A lost connection is provided between the support of the shoes and the manual controls of the brake system, so that the manual portion of the brake mechanism remain in fixed position regardless of axle position. Hence, there will not be any inconvenience to the user of the wheelchair. Further, the lost motion connection does not lose any appreciable braking forces transmitted through it, wherefore braking action is not diminished by any axle pivot that may occur.

Another aspect of the invention is improved steering. A steering handle is provided which is grasped by the palm and fingers for turning the vehicle. A vertically depressible rod concentric with, and protruding above the steering handle controls speed, and the thumb motion is a separate muscular movement distinct from that of the steering action. Infirm people can master this dual, muscularly separate control system, so as to operate the wheelchair with confidence and without confusion.

Other objectives of the invention include comfort for the user of a wheelchair; reductions in costs to enable a more widespread use of motorized wheelchairs; location of all four wheels within the extremities of the framework serving as an undercarriage for the chair proper; ease of steering and handling; reversibility of positions of the front wheels to have either left hand or right hand side steering; ease of entry and exit from a chair; sufficient collapsibility for shipping; housing a drive motor and its power consuming electrical control components within a single hood; easily operable speed control and forward and reverse operation of a wheelchair; and maintenance of the composite center of gravity of a wheelchair, its power supply, and of a user in normal position well within the outline of the points of ground engaging contact of the chair.

BRIEF DESCRIPTION OF THE DRAWINGS

FIG. 3 is a top view of an undercarriage portion of the wheelchair taken through the plane 3—3 indicated in FIG. 2, FIG. 4 is a view in section of a portion of the undercarriage of the wheelchair taken through the plane 4—4 indicated in FIG. 2 which intersects the axle of the rear wheels of the wheelchair, FIG. 5 is a fragmentary view on an enlarged scale of the right hand rear portion of the wheelchair showing a brake mechanism in conjunction with the rear wheels, FIG. 6 is a fragmentary view of the backrest of the chair taken through the plane 6—6 indicated in FIG. 1, FIG. 7 is a fragmentary plan view in section with parts broken away which is taken over the front wheels through the plane 7—7 indicated in FIG. 2, FIG. 8 is a fragmentary view of a steering column forming a part of the wheelchair which is taken through the plane 7—7 and which is on an enlarged scale as contrasted to the drawing of FIG. 7.

DESCRIPTION OF THE PREFERRED EMBODIMENT

Figure 1:
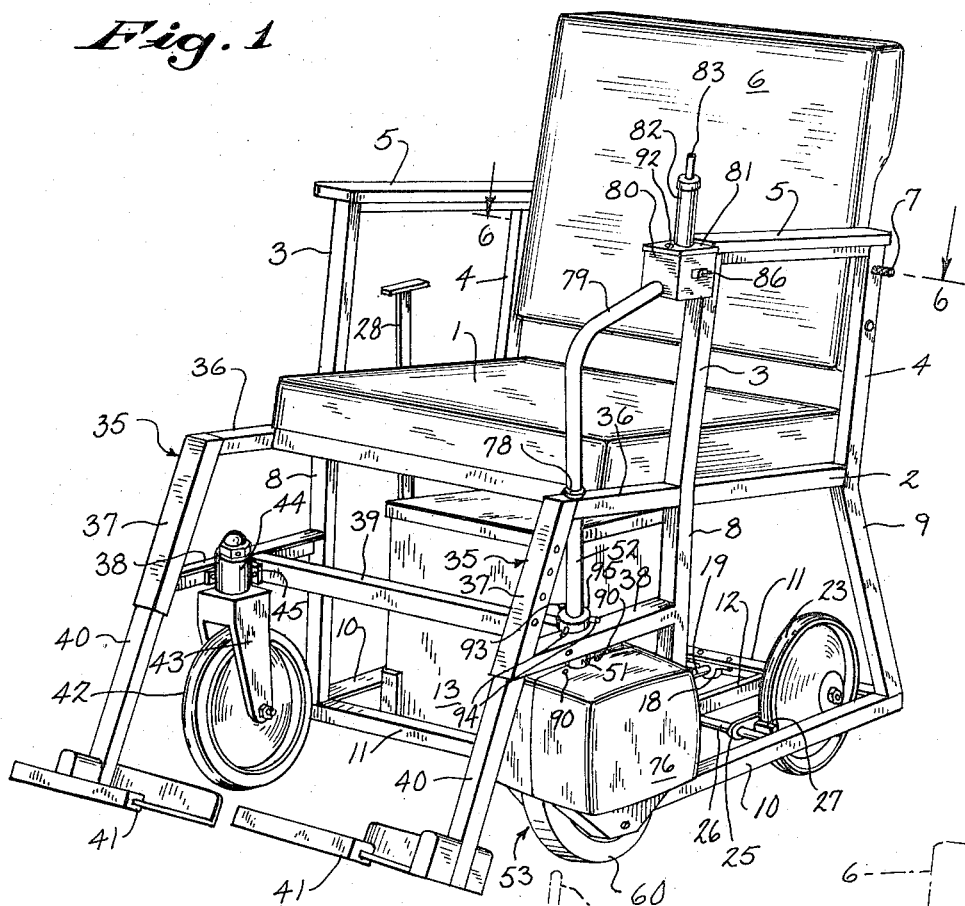
FIG. 1 is a view in perspective of a wheelchair embodying the present invention.
Figure 2:
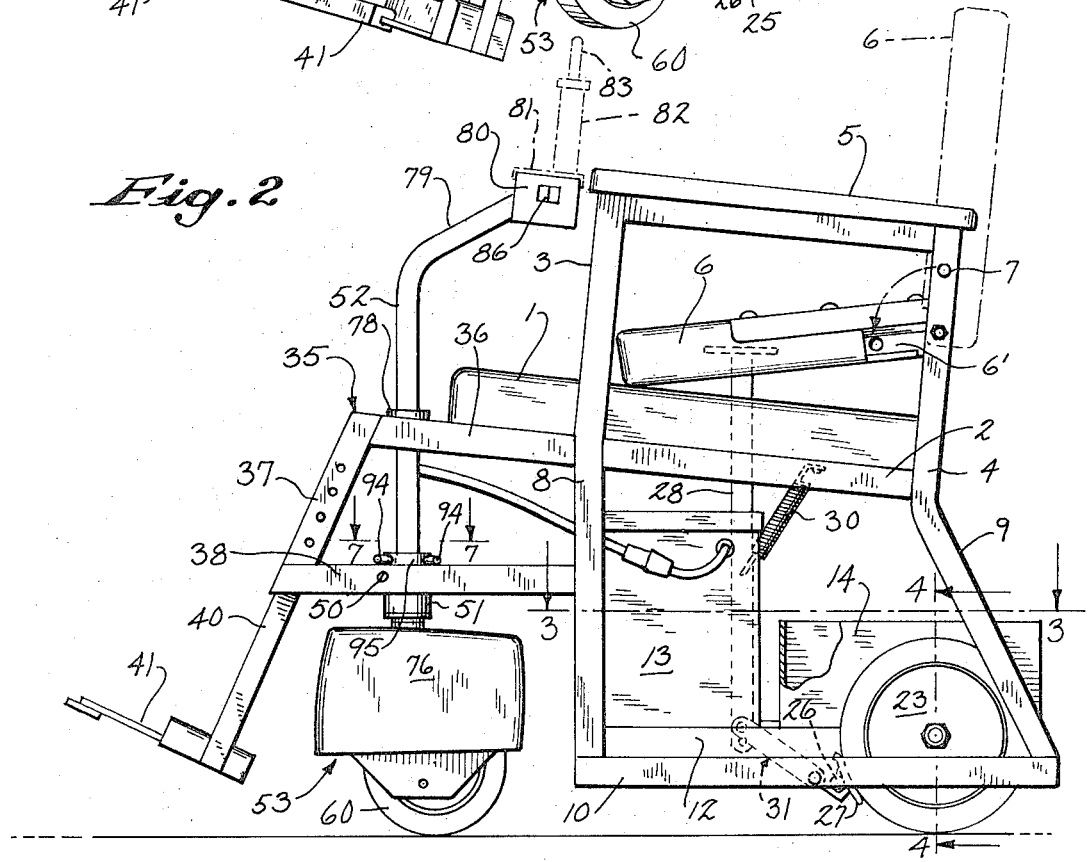
FIG. 2 is a left side view in elevation of the wheelchair with some parts drawn in phantom and with a luggage box having a portion thereof broken away and in section.

The perspective view of FIG. 1 shows a wheelchair having a cushion seat 1 supported on a pair of fore and aft extending side frames 2. Rising upward from each side frame 2 are fore and aft vertical frame members 3 and 4 that support an arm rest 5. Between the two vertical aft frame members 4 there is supported a pivoted backrest 6 that is shown in an upright position in FIG. 1, and a lowered, or depressed position in FIG. 2. As shown in FIG. 6, a pair of spring biased pins 7 mounted in the aft frame members 4 enter brackets 6' fastened to the sides of the backrest 6 to hold it in an upright position. The purpose of having the backrest 6 fold downward, as shown in FIG. 2, is to facilitate storage, shipment in a carton, or transport in vehicles such as station wagons having limited height openings through which the wheelchair may be inserted.

THE UNDERCARRIAGE FRAMEWORK

To support the chair proper, make up of the seat 1 and backrest 6, two front legs 8 and two rear legs 9 extend downward as continuations of the vertical side frames 3 and 4. A pair of longitudinal, base forming joists 10 located one at each side of the wheelchair are parallel to the ground and extend between the front chair legs 8 and the rear chair legs 9. A pair of transversely extending joists 11, also parallel to the ground, extend transverse of the wheelchair with one joist 11 connecting between the lower ends of the front chair legs 8 and the other joist 11 connecting between the lower ends of the rear chair legs 9. The resulting quadralateral base framework is shown in FIG. 3.

A pair of fore and aft, or longitudinally extending, rack rails 12 are fastened at their forward ends upon the front transverse joist 11 and at their after ends on the rear transverse joist 11. The rack rails 12 are spaced equal distances on opposite sides of the fore and aft center line of the wheelchair, and they are L-shaped in cross section, as indicated in FIG. 4 to present a support for both a battery case 13 and a luggage box 14. The luggage box 14 is directly behind the battery case 13 to serve as a convenient receptacle for items of the person confined to the wheelchair. Only a minor fraction of the luggage box 14 is shown in FIG. 3, so as to reveal the construction of portions of the undercarriage that are directly beneath the luggage box 14.

The battery case 13 is of a size to accommodate an ordinary storage cell, and the location of the battery case 13 is seen to be directly beneath the center of the chair cushion 1, so as to locate the center of gravity of this relatively heavy item at, or near, the geometric center. The battery case 13 is also in substantial vertical alignment with the intended position of the center of gravity of a person within the wheelchair, so as to enhance the stability of the structure. To hold the battery case 13 firmly in place, a chip 15 may be used as shown in FIGS. 3 and 4.

THE REAR WHEEL SUPPORT

Referring now particularly to FIGS. 3 and 4, a transverse strap 16 extends between the two rack rails 12 some distance forward of the rear transverse joist 11. On the underside of the transverse strap 16 is secured a bearing 17, and a similar bearing 18 is secured to the underside of the rear transverse joist 11. The center lines of the two bearings 17, 18 are aligned with one another along the longitudinal center line of the wheelchair. A short pivot shaft 19 is mounted in the bearings 17, 18 to form a pivot therewith, and tightly secured upon the pivot shaft 19 at its mid-point is a rear axle 20. The rear axle 20 is a box shaped tubular member, and at each end of this channel shaped member is secured an upwardly rising offset 21. A side view of an offset 21 is particularly well shown in FIG. 5, and the upper end of each vertical offset 21 receives a stub shaft 22 of a rubber tired rear ground engaging wheel 23. Each rear wheel 23 and its associated vertical axle offset 21 is disposed inboard of an adjacent longitudinal joist 10, so as to be in position between such longitudinal joist 10 and one of the rack rails 12.

As is particularly illustrated in FIG. 4, the pivotal mounting of the rear axle 20 at its mid-point on the pivot shaft 19 permits each of the rear wheels 23 to rise and fall with respect to the undercarriage and the remainder of the wheelchair. This permits some deviation of the axle 20 from the wheelchair proper, so that when uneven terrain is encountered the rear wheels 23 can move to a limited degree that permits the chair portion of the wheelchair to remain stable in a nearly horizontal position, thus giving a more comfortable ride and a secure feeling to the user of the wheelchair.

The pivotal movement of the rear axle 20, about the pivot comprising the shaft 19 and the bearings 17, 18 is limited. This limitation arises from a closed spacing of the top of the rear axle 20 from the underside of each of the rack rails 12. When the axle 20 is aligned with the remainder of the wheelchair, as shown in FIG. 4, there is a small gap 24 between the top of the axle 20 and each of the rack rails 12. Thus, the bottom faces of the rack rails 12 function as motion limiting abutments for the axle 20. As a result, there is some limited pivotal motion of the axle 20 in response to uneven terrain which produces a smoother, gentler ride, but it is limited so that a person who is in the wheelchair will neither feel an unsteady chair beneath him, nor will dangerous tilting motion of the entire chair occur which might upset the chair or make the user uneasy.

THE BRAKE MECHANISM

Referring particularly to FIG. 5, a substantially horizontal link 25 is pivoted at its rear end to the bottom of the vertical axle offset 21, and this structure is duplicated at the opposite end of the rear axle 20. Extending between the forward ends of the two links 25 is a rod shaped brake shaft 26. It is seen that the rear, pivoted ends of each of the links 25 is disposed a distance downward from the center of rotation of the rear wheels 23, as represented by the stub shafts 22, so that when the links 25 are raised their forward ends will carry the brake shaft 26 toward the faces of the rear wheels 23.

Mounted on the outer ends of the brake shaft 26 is a pair of brake shoes 27, each shoe 27 being in direct facing relation to the periphery of an associated rear wheel 23, as shown in FIG. 3. Hence, by a swinging motion of the links 25 and the brake shaft 26 the brake shoes 27 are moved into and out of engagement with the faces of the wheels 23. Thus, braking force can either be applied or released, and since the links 25 and brake rod 26 are carried by the axle 20 the brake shoes 27 are constantly in alignment with the wheels 23.

To operate the brake shoes 27 there is provided a manual brake handle 28, clearly shown in FIG. 5, that rises upwardly alongside the chair cushion 1. The brake handle 28 extends through an appropriate opening in the right hand side frame 2 and is notched to engage a catch 29 on the underside of the frame 2. A coil spring 30 biases the brake handle 28 upward, and an upward motion of the handle 28 will function to release the brake shoes 27 from the rear wheels 23.

The bottom end of the brake handle 28 is pivotally connected with a brake lever 31 which is made up of several parts. These parts are best seen in FIGS. 3 and 5. The brake lever 31 has a pivoted rod 32 extending between and beneath the rack rails 12. One end of the rod 32 is secured to a strut 33 that joins with the lower end of the brake handle 28, so that an up and down motion of the brake handle 28 will result in a pivot of the rod 32. At the mid-point of rod 32 there is integrally fastened, as by welding, a connection hook 34 which, as seen in FIG. 5, partially encircles the brake shaft 26. The connection of the hook 34 with the brake shaft 26 is a lost motion connection, in that the brake shaft 26 is free to pivot in a teeter-totter like motion within the hook 34 without losing engagement between the parts. Any pivot of the brake shaft 26 will be due to the corresponding pivot of the rear axle 20, which is translated through the link 25 to the brake shaft 26, as described above.

It is readily seen that when the brake handle 28 is depressed the connection hook 34, which is fast upon the rod 32, will rise, and in turn lift the shaft 26 upward to bring the brake shoes 27 into engagement with the rear wheels 23. An upward motion of the brake handle 28 will cause a reverse of this operation in which the brake rod 26 falls and the links 25 controlling the radius of motion move the brake shoes 27 away from the faces of the wheels 23.

A particular feature of the brake mechanism is the development of positive braking force applied to both rear wheels 23 regardless of the angle of pivot of the rear axle 20. As has been indicated, the brake shoes 27 are mounted so that they move with the pivoting motion of the rear wheels 23 to maintain proper alignment of these portions of the apparatus. On the other hand, the brake actuating mechanism constituting the brake handle 28 and the brake lever 31 are maintained in a fixed relation with the chair proper, so that at all times the brake handle 28 is in a position that remains constant insofar as the operator of the wheelchair is concerned.

THE FRONT FRAMEWORK

Referring now particularly to FIGS. 1 and 2, there extends forward from each side of the chair a cantilevered, front wheel supporting frame 35. Each frame 35 is comprised of an extension 36 of a side frame 2, a forwardly and obliquely downward extending strut 37, and a lower horizontal brace 38 reaching between the lower end of the strut 37 and a front chair leg 8. Between the braces 38 there extends a reenforcing cross bar 39. Telescoped within the struts 37 are adjustable legs 40 which carry pivoted foot rests 41 at their lower ends. By adjusting the legs 40 within the struts 37 the foot rests 41 can be raised and lowered to suit the need of the occupant of the wheelchair.

An idler type front wheel 42 is located on the right hand side of the wheelchair and is borne by a forked castor 43. The castor 43 is carried by a bearing housing 44, which has an L-shaped mounting bracket 45, as particularly shown in FIG. 7. The bracket 45 is secured to the right hand brace 38 and the cross bar 39 by a pair of mounting bolts 46, 47. The idler wheel 42 functions to support the front, right corner of the wheelchair, and it freely pivots about its vertical axis in tandem with a front power wheel to be described.

Figure 12:
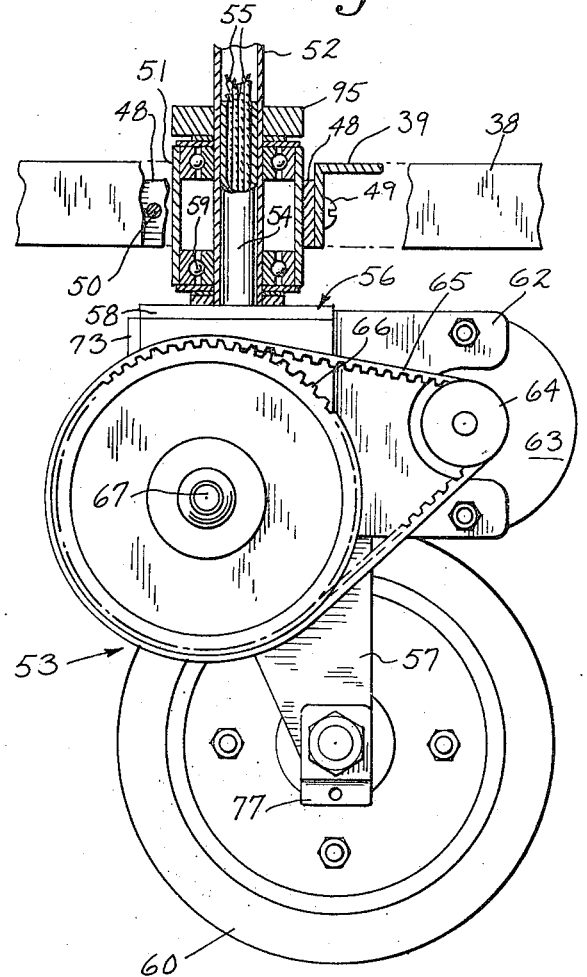
FIG. 12 is an enlarged view of the bottom portion of a power unit forming a part of the wheelchair with a cover that normally shrouds the power unit removed to expose the interior.
Figure 13:
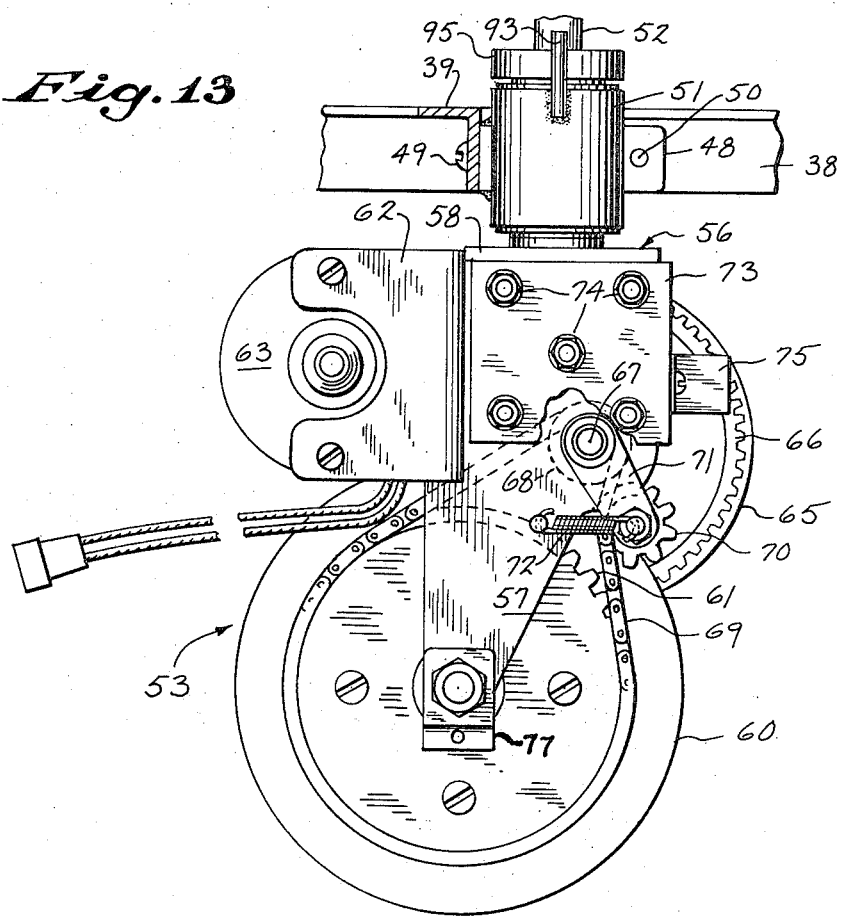
FIG. 13 is a view of the power unit shown in FIG. 12 as seen from the opposite side thereof.

A second L-shaped wheel mounting bracket 48, which is shown in FIGS. 7, 12 and 13, is mounted by a set of bolts 49 and 50 to the left hand end of the cross bar 39 and the left brace 38. The size and shape of the two mounting brackets 45, 48 is the same, and the position of the bolt holes for the mounting bolts 46, 47, 49 and 50 are such that the brackets 45 and 48 can readily be interchanged in position. This allows for mounting the ground engaging idler wheel 42 on either side of the wheelchair, and similarly the power unit to be described can also be mounted on either the right or left hand side of the wheelchair, to suit the needs or desires of the user of the chair.

THE STEERABLE POWER UNIT

Figure 14:
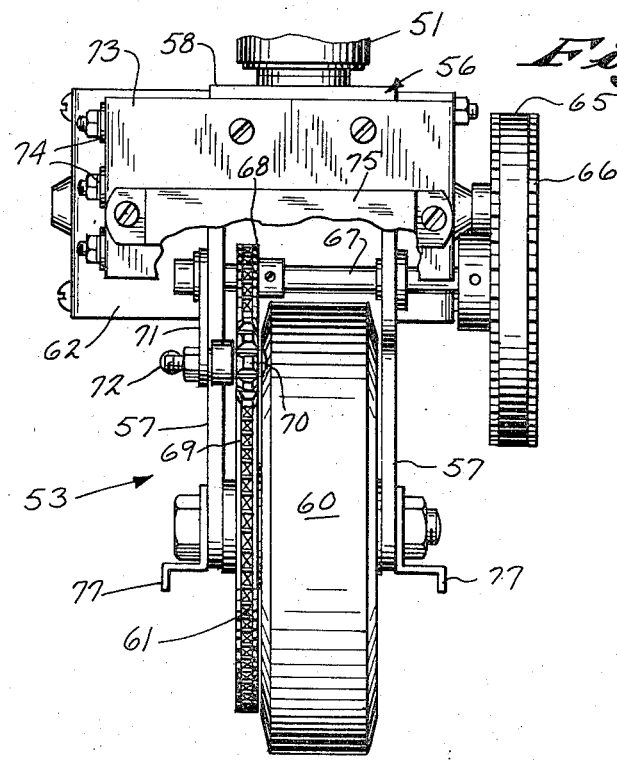
FIG. 14 is a front view of the power unit of FIGS. 12 and 13.

Referring now to FIGS. 12 and 13, a circular, cylindrical bearing housing 51 that is like the housing 44 is secured on the bracket 48. The housing 51 has an internal bearing 59 that receives the lower end of a vertical, tubular shaft 52. There is a steerable power unit 53, shown on an enlarged scale in FIGS. 12, 13 and 14, having a stub shaft 54 inserted tightly into the bottom of the tubular shaft 52, and the stub shaft 54 is hollow to accommodate control wires 55 that extend through the length of the tubular shaft 52.

On the bottom of the stub shaft 54 is a castor 56 presenting a pair of spaced, downwardly extending castor legs 57 that are bridged at their top by a web 58. Rotatably mounted between the lower ends of the castor legs 57 is a rubber tired, ground engaging, drive wheel 60 that has a large gear wheel 61 attached to one side thereof in concentric relation with the axis of rotation.

Secured to the top rear of the castor legs 57 is a transversely extending motor bracket 62 that mounts an electric motor 63 powered by the energy cell within the battery box 13. As seen in FIG. 12, the motor shaft has a small diameter, toothed gear wheel 64. A toothed belt 65 that is driven by the wheel 64 travels around a large diameter, toothed, reduction gear wheel 66. The wheel 66 is mounted on and drives an idler shaft 67 that is borne between the castor legs 57 at a position above the drive wheel 60. Secured to the idler shaft 67, and located between the two castor legs 57, is a pinion gear 68 which drives a chain 69 in mesh with the large diameter gear 61 fastened on the side of the drive wheel 60.

A keeper pinion 70 is rockably mounted on an arm 71 depending from the idler shaft 67, and a bias spring 72 urges the keeper pinion 70 into mesh with the chain 69 to keep the chain 69 taut at all times. This ensures positive, mating engagement between the chain 69 and the gear teeth of the pinion 68 and the large gear 61, and it also functions to reduce lost motion between forward and reverse operation of the wheelchair.

A highly heat conductive plate 73, preferably of aluminum or like heat conductive metal, is mounted transversely across the castor legs 57 on the front side opposite from the motor bracket 62. The heat conductive plate 73 functions as a heat sink, and mounted on a portion of this heat sink that bends backward and alongside one of the castor legs 57 is a set of five heat evolving semi-conductor elements 74 which are utilized in the control of the motor 63. Mounted across the front face of the heat sink 73 is a heat evolving resistor 75, which also is utilized in the control of the motor 63. By attaching the heat sink 73 to the castor 56 the necessary power dissipation, as represented by heat, can be achieved at a point on the wheelchair which is remote from the user, so that there is no exposure to a person in the chair. Wiring connecting to the elements 74 and resistor 75 have been omitted from the drawings, since their exact location is not a part of the invention.

A lightweight cover is provided for the mobile power unit 53 which shrouds the motor 63, the heat sink plate 73, the first speed reduction unit comprising the toothed gear wheel 64 and the large diameter reduction gear wheel 66, and the second reduction unit comprising the pinion gear 68 and the large diameter gear 61. This protective cover for the power unit is shown in FIGS. 1 and 2, and is identified by the designating reference numeral 76. It is attached to a pair of brackets 77, shown in FIGS. 12, 13 and 14 which depend from the axle for the drive wheel 60, and is also fastened in place by attachment screws 90, seen in FIG. 1, which enter the top web 58 of the castor 56.

THE STEERING COLUMN

Referring now to FIGS. 1 and 2, the tubular shaft 52 rises vertically upward from the bearing housing 51 and passes through a support bearing 78 in the frame member 36 of the cantilevered left side framework 35. The upper end of the tubular shaft 52 turns rearwardly toward the left side arm rest 5 to present a tiller arm 79, and mounted on the upper, rear end of the tiller arm 79 is a rectangular control box 80.

Figure 9:
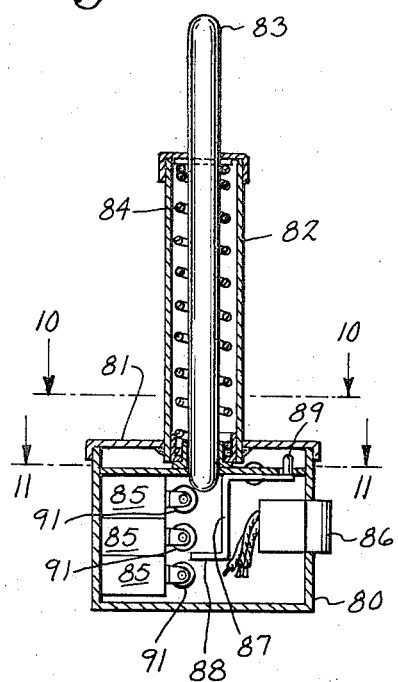
FIG. 9 is a view in vertical section of a control box and operating handle for the wheelchair.
Figure 10:
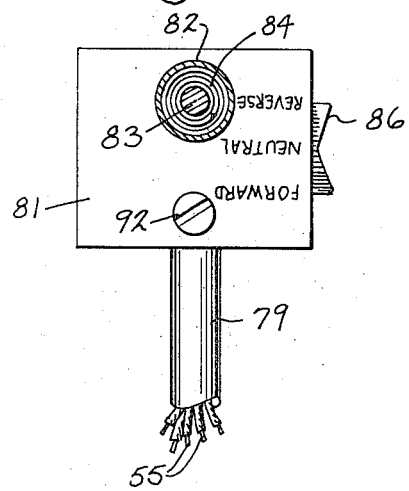
FIG. 10 is a top view of the mechanism of FIG. 9 taken through the plane 10—10 indicated in FIG. 9.
Figure 11:
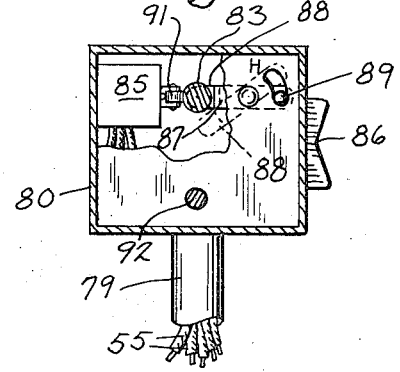
FIG. 11 is a view in cross section of the mechanism of FIG. 9 taken through the plane 11—11 indicated in FIG. 9.

The control box 80 is shown on an enlarged scale in FIGS. 9, 10 and 11. It has a removable cover 81 which mounts a vertical steering handle 82. The handle 82 is hollow and extending through the handle 82 is a vertically depressible speed selector rod 83. The rod 83 is biased upward by a spring 84 to the position shown in FIG. 9. Within the control box 80 is a set of three speed selector switches 85 which are tiered one above the other with their operating heads 91 extending into the path of travel of the speed selector rod 83. As is readily apparent from FIG. 9, the speed selector rod 83 may be depressed to successively move its lower end against the operating heads of the switches 85.

A forward reverse switch 86 is mounted within the control box 80. Also, a mechanism is provided which may cut out use of the lowermost of the speed selector switches 85. This mechanism is a bracket 87 that has a tip 88 which can be moved into the vertical path of travel of the bottom end of the speed selector rod 83. The bracket 87 is pivotally mounted, and has a small finger 89 at its upper end which can be operated upon removal of the cover 81, as indicated in FIG. 11, so that the bracket 87 may either be put into operative position, or swung aside to have no affect. By swinging the tip 88 into the operative position of blocking full downward movement of the rod 83, the downward motion of the speed selector rod 83 is arrested before it comes to the last speed selector switch 85. Thus, if the lowermost speed selector switch 85 is a high speed switch the mechanism can be adjusted so that the user of the wheelchair cannot bring the chair into a high speed condition. Control wires 55 from the speed selector switches 85 and the forward reverse switch 86 pass into the top of tubular shaft 52 and extend down to the power unit 53, as was previously identified in the description for FIG. 12. The cover 81 can be removed by loosening a screw 92, shown in FIG. 10, so that when the backrest 6 is also lowered the top profile of the wheelchair is defined by the arm rests 5, as indicated in FIG. 2.

The tiller arm 79 provides easy steering of the wheelchair by a simple turning back and forth of the tubular shaft 52. The vertical handle 82 can be firmly gripped in the palm and fingers of most all persons, and the gripping type muscular action is such that normal people will readily associate the gripping action with the turning of the tiller arm, so that steering can be safely carried out by elderly people, invalids and other infirm individuals. The speed selection which is provided by the depressible rod 83 calls for a distinctly different muscular action than for the steering accomplished by gripping the handle 82 in one's palm and fingers. A thumb motion is required for depressing the speed selector rod 83, and a motion of a thumb is a human motor action quite separate and distinct from palm movements. Thus, it is believed that two distinctly different muscular coordination systems are brought into play in the operation of the chair, which lessens operator confusion as contrasted with steering and speed controls which simultaneously use a palm for steering and speed selection.

The tubular shaft 52 together with the power unit 53 at the lower end and the tiller arm 70 and control box 80 at the upper end forms a steering column which rests upon the ground at all times, except possibly in extreme conditions of uneven terrain that are abnormal to wheelchair use. Sharp turns for high mobility can be made by easy movements of the tiller arm 79. It is usually desirable to place some limit upon the degree of permissible rotation, so that reverse motion is not unexpectedly encountered by wide swings of the arm 79. For this limitation, an upright, stationary stop pin 93 is secured to the side of the bearing housing 51, as shown in FIGS. 8 and 13. A pair of radial extending fingers 94 are disposed on a collar 95 (see FIG. 8) which rotates with the shaft 52. These fingers 94 will strike the stop pin 93 to limit rotation of the steering column.

CONCLUSION

The wheelchair of the invention provides an apparatus embodying several features, as have been discussed herein. Unique to wheelchair construction is four wheel support in which a single ground engaging driving wheel is held against the terrain to maintain control of the chair. The two rear wheels are on a pivoted axis, which provides a simulated point of engagement with a ground at the place of axle pivot, thus keeping all wheels on the ground. The two front wheels and the simulated point of engagement of the rear wheels at the pivot of the rear axle provides an effective tripodal support for the chair, with the center area of the chair, the battery mass, and an occupant all well within the triangular outline of the tripod. One of the front wheels can now be an effective drive wheel, and special supports for this drive wheel are eliminated. A unique braking mechanism for the pivoted rear wheels augments the construction through introduction of a lost motion connection between wheel engaging brake shoes and the manually operable parts of the brake system. Further, the invention provides a steering column with a self contained power unit which is easily manipulated for both steering and speed control.

I claim:

1. In a wheelchair having a chair, a set of ground engaging wheels and space for an energy cell beneath the chair, the combination comprising:
   a. a pivot located beneath and at the rear of the chair providing a turning axis along the longitudinal center of the wheelchair;
   b. a rear axle connected substantially at its mid-point to said pivot for tilting in a vertical, transverse plane;
   c. a pair of ground engaging rear wheels, one at each end of said axle, located beneath the rear sides of the chair;
   d. a pair of motion limiting abutments, one on each side of said pivot, that are each disposed in vertical alignment with said rear axle, and at a spaced distance therefrom when said rear axle is in the horizontal;
   e. a front ground engaging idler wheel pivotally mounted at the front and one side of the chair for turning movement about a vertical axis;
   f. a drive motor unit pivotally mounted at the front of the chair on the side opposite said idler wheel, and having a drive motor and a depending ground engaging traction wheel in driven relation to the motor;
   g. said ground engaging traction wheel, idler wheel and pivoted rear wheels forming tripodal support points for the chair with the center area of the chair encompassed within the triangle defined by said traction wheel, said idler wheel and said pivot; and
   h. a steering shaft rising upwardly from said drive motor unit that is pivotable about a vertical axis for turning said drive motor unit.

2. A wheelchair as in claim 1 in which the chair has four legs depending at the front and rear corners and there is
   i. a pair of longitudinal joists one at each side and each extending between the bottoms of the chair legs at its side;
   j. a pair of transverse joists, one extending between the front chair legs and the other between the rear chair legs;
   k. a pair of parallel, longitudinally extending rack rails set inboard from said longitudinal joists and extending between said transverse joists; and in which
   l. said rear axle passes beneath said rack rails, with the underside of the rack rails forming said motion limiting abutments; and in which
   m. said ground engaging rear wheels are positioned inboard of said longitudinal joists and outboard of said rack rails.

3. A wheelchair as in claim 1 having:
   i. a brake shaft extending between said ground engaging rear wheels pivotally supported from said rear axle;
   j. brake surfaces on said brake shaft located adjacent said rear wheels;
   k. and a brake lever cooperatively engaged with said brake shaft to pivot the same and move said brake surfaces against said rear wheels upon movement of the brake lever.

4. A wheelchair as in claim 1 in which said steering shaft extends upward from the drive motor unit and turns rearward to form a turning tiller, and at its upper end mounts a control box with a substantially vertical, palm grippable handle, and from the top of which there extends a substantially vertically movable thumb depressible speed control member.

5. A wheelchair as in claim 1 having:
  i. a pair of cantilevered front wheel supporting frames each jutting forward of said chair at a side thereof;
  j. a pair of brearing brackets each detachably mounted on one of said frames with mounting means providing for reversing the positions of the two bearing brackets;
  k. one of said bearing brackets mounting said ground engaging idler wheel and the other of said bearing brackets mounting said ground engaging traction wheel.

6. A wheelchair as in claim 5, with a foot support depending from each cantilevered front wheel supporting frames.

7. In a wheelchair having a chair, framework for the chair, and ground engaging wheels, the combination comprising:
  a. a pivotally mounted axle mounted on the framework that tilts about an axis transverse to the axle;
  b. rotatable wheels at the ends of the axle;
  c. a pair of links extending transversely from the axle which are pivotally attached to the axle at points spaced from the center of rotation of said wheels;
  d. a brake shaft extending between the wheels and joined to the ends of said pair of links at points remote from their pivotal attachment to the axle;
  e. brake surfaces on the brake shaft disposed in facing relation to said wheels;
  f. a brake lever in a connection with said brake shaft permitting tilt of said shaft with respect to said lever, said brake lever movable to translate said brake shaft and thereby pivot the shaft and said links about the pivotal attachment of the links to the axle to move said brake surfaces toward and away from said wheels; and
  g. means for operating said brake lever.

8. A wheelchair brake mechanism as in claim 7, wherein said connection between the brake shaft and brake lever comprises a hook extending from the brake lever in which the brake shaft is held, such hook being in alignment with the axis of pivot of said axle.

9. In a wheelchair having a chair and a set of ground engaging wheels the supporting undercarriage for the chair comprising:
  a. a set of four chair legs at the forward and rear corners of the chair;
  b. a pair of longitudinal joists one at each side and each extending between the bottoms of the chair legs at its side;
  c. a pair of transverse joists, one extending between the front chair legs and the other between the rear chair legs;
  d. a pair of parallel, longitudinally extending rack rails set inboard from said longitudinal joists and extending between said transverse joists; and in which
  e. a pivot supported from the foregoing members having an axis of pivot on the longitudinal center line of the wheelchair;
  f. an axle supported at its mid-point by said pivot and passing beneath said rack rails at a distance therebeneath permitting limited rocking of the axle about said pivot;
  g. a pair of ground engaging rear wheels on said axle that are each located between a longitudinal joist and a rack rail;
  h. front wheel supporting frames extending forward from the front chair legs; and
  i. front ground engaging wheels mounted on said front wheel supporting frames.

10. In a wheel chair having a chair, framework for the chair, and ground engaging wheels, the combination comprising:
  a. a pivotally mounted axle mounted on the framework that tilts about an axis transverse to the axle;
  b. rotatable wheels at the ends of the axle;
  c. a brake member connected to said axle that pivots therewith to maintain alignment between the brake member and axle;
  d. braking surfaces on said brake member adjacent said wheels for braking engagement therewith; and
  e. a brake operating lever having a lost motion connection with said brake member, such lost motion being in the direction of tilt of the brake member.

* * * * *